(12) United States Patent
Kumarasamy et al.

(10) Patent No.: US 8,355,323 B2
(45) Date of Patent: Jan. 15, 2013

(54) INTERACTIVE VOICE RESPONSE AND SECURE MEDIA SYSTEM INTEGRATION

(75) Inventors: Parameswaran Kumarasamy, San Jose, CA (US); Soumya Kalahasti, Fremont, CA (US); Prasad Miriyala, Union City, CA (US); Manjunath Bangalore, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1475 days.

(21) Appl. No.: 11/554,203

(22) Filed: Oct. 30, 2006

(65) Prior Publication Data

US 2008/0101336 A1 May 1, 2008

(51) Int. Cl.
*H04J 1/16* (2006.01)
*H04L 12/28* (2006.01)
*H04L 12/56* (2006.01)
(52) U.S. Cl. .............. 370/230; 370/395.2; 370/410
(58) Field of Classification Search .............. None
See application file for complete search history.

(56) References Cited

U.S. PATENT DOCUMENTS

| | | | | |
|---|---|---|---|---|
| 6,404,746 | B1* | 6/2002 | Cave et al. | 370/262 |
| 2005/0021616 | A1* | 1/2005 | Rajahalme et al. | 709/204 |
| 2005/0163316 | A1* | 7/2005 | Wing | 380/257 |
| 2007/0115945 | A1* | 5/2007 | Gass et al. | 370/356 |

OTHER PUBLICATIONS

Baugher et al., "RFC-3711 The Secure Real-time Transport Protocol (SRTP)", The Internet Society, Mar. 2004.*

* cited by examiner

*Primary Examiner* — Faruk Hamza
*Assistant Examiner* — Cassandra Decker
(74) *Attorney, Agent, or Firm* — Haynes and Boone LLP

(57) ABSTRACT

In one embodiment, a method is provided, including: initiating an interactive voice response (IVR) session between a first endpoint and an IVR system over an IP network; establishing a first media path between the first endpoint and a second endpoint; establishing a second media path between the first endpoint and the IVR system; and receiving at the IVR system a notice of a telephony event from the first endpoint. In another embodiment, a method is provided, including: initiating an interactive voice response (IVR) session between a first endpoint and an IVR system over an IP network; establishing a secure media path between the first endpoint and a second endpoint; and receiving an unsecured notice of a telephony event from the first endpoint.

17 Claims, 11 Drawing Sheets

300 ⟶

301 ⟶

INVITE sip:8787@1.7.56.55:5060 SIP/2.0
Via: SIP/2.0/UDP 1.7.56.102:5060;branch=z9hG4bK5AB
From: <sip:1.7.56.102>;tag=5B9F658-18A0
To: <sip:8787@1.7.56.55>

302 ⟶ m=audio 2222 RTP/AVP 0
c=IN IP4 2.2.2.2
a=sendonly

303 ⟶ m=audio 3332 RTP/AVP 0
c=IN IP4 3.3.3.3
a=sendrecv

SIP/2.0 200 OK
Via: SIP/2.0/UDP 1.7.56.102:5060;branch=z9hG4bK5AB
To: <sip:8787@1.7.56.55>;tag=ds1dc5c6a
From: <sip:1.7.56.102>;tag=5B9F658-18A0
Content-Type: application/sdp

312 ⟶ m=audio 1112 RTP/AVP 0
c=IN IP4 1.1.1.1
a=recvonly

313 ⟶ m=audio 1114 RTP/AVP 0
a=1.1.1.1
a=sendrecv

INVITE sip:8787@1.7.56.55:5060 SIP/2.0    ⟵ 501
Via: SIP/2.0/UDP 1.7.56.102:5060;branch=z9hG4bK5AB
From: <sip:1.7.56.102>;tag=5B9F658-18A0
To: <sip:8787@1.7.56.55>    ⟵ 502 m=audio 2222 RTP/AVP 0 101
c=IN IP4 2.2.2.2
a=rtpmap:0 PCMU/8000
a=rtpmap:101 telephone-event/8000
a=fmtp:101 0-16
a=sendrecv    ⟵ 503 m=audio 3332 RTP/AVP 0 101
c=IN IP4 3.3.3.3
a=rtpmap:0 PCMU/8000
a=rtpmap:101 telephone-event/8000
a=fmtp:101 0-16
a=sendrecv

FIG. 5A

510 ⬉
⟵ 511
SIP/2.0 200 OK
Via: SIP/2.0/UDP 1.7.56.102:5060;branch=z9hG4bK5AB
To: <sip:8787@1.7.56.55>;tag=ds1dc5c6a
From: <sip:1.7.56.102>;tag=5B9F658-18A0
Content-Type: application/sdp    ⟵ 512 m=audio 1112 RTP/AVP 0 101
c=IN IP4 1.1.1.1
a=rtpmap:0 PCMU/8000
a=rtpmap:101 telephone-event/8000
a=fmtp:101 0-16
a=sendrecv    ⟵ 513 m=audio 1114 RTP/AVP 0 101
c=IN IP4 1.1.1.1
a=rtpmap:0 PCMU/8000
a=rtpmap:101 telephone-event/8000
a=fmtp:101 0-16
a=sendrecv

INVITE sip:8787@1.7.56.55:5060 SIP/2.0
Via: SIP/2.0/UDP 1.7.56.102:5060;branch=z9hG4bK5AB
From: <sip:1.7.56.102>;tag=5B9F658-18A0
To: <sip:8787@1.7.56.55>          ⭦ 802 m=audio 17012 RTP/SAVP 0 101
c=IN IP4 3.3.3.3
a=crypto:5922 AES_CM_128_HMAC_SHA1_32 inline:ZqXOmxDEzxG4+M2QquQ9Pg8MBM+Btv0gnGMdS3Xu
a=rtpmap:0 PCMU/8000
a=rtpmap:101 telephone-event/8000
a=fmtp:101 0-16          ⭦ 803 m=audio 17014 RTP/AVP 0 101
c=IN IP4 2.2.2.2
a=rtpmap:101 telephone-event/8000
a=fmtp:101 0-16

SIP/2.0 200 OK
Via: SIP/2.0/UDP 1.7.56.102:5060;branch=z9hG4bK5AB
To: <sip:8787@1.7.56.55>;tag=ds1dc5c6a
From: <sip:1.7.56.102>;tag=5B9F658-18A0
Content-Type: application/sdp          ⭦ 812 m=audio 18200 RTP/SAVP 0 101
c=IN IP4 1.1.1.1
a=crypto:5922 AES_CM_128_HMAC_SHA1_32 inline:ZWuAJCVj4AiHTV//3U/64hxFqNLiu7FYi4AQkj4r
a=rtpmap:0 PCMU/8000
a=rtpmap:101 telephone-event/8000
a=fmtp:101 0-16          ⭦ 813 m=audio 17012 RTP/AVP 0 101
c=IN IP4 1.1.1.1
a=rtpmap:101 telephone-event/8000
a=fmtp:101 0-16

FIG. 8B

INTERACTIVE VOICE RESPONSE AND SECURE MEDIA SYSTEM INTEGRATION

BACKGROUND

With the increased availability of broadband Internet connections, the use of Voice over Internet Protocol (VoIP) to make telephone calls over the Internet has also increased. In many cases, telecommunications service providers (SPs) implement voice communications systems that provide various services to subscribers, such as interactive voice response (IVR) applications. In IVR applications, an individual on one end of the call interacts with an IVR system on the other end of the call. The IVR system may be implemented in a device such as a Session Border Controller (SBC), TDM-IP gateway etc. Typically, the IVR system plays pre-recorded voice prompts in response to which the individual speaks a response or presses a number on the telephone keypad to select an option. One common application for IVR systems is a calling card service in which a subscriber places an initial call to an SBC, which provides a voice menu to prompt the subscriber to provide identification and target destination information. The information may be entered by the subscriber by pressing keys on the telephone keypad, which generates dual-tone multi-frequency (DTMF) signals corresponding to the pressed keys.

The extension of the call from the SBC to the target endpoint may be performed in a variety of ways. In flow-through systems, the media traffic between the originating and terminating endpoints flows through the SBC. Thus, the SBC can monitor the communications between the endpoints. In flow-around systems, the media traffic flows directly between the endpoints without passing through the SBC. In flow-through systems, the SBC must process each incoming packet, so the load on the SBC can be significant. As a result, the total number of simultaneous calls that may be supported may be decreased, and a media switching delay may be introduced. Flow-around systems may eliminate some of these problems by bypassing the SBC for media communications. However, in flow-around systems, the SBC can no longer monitor the audio and other media communications from the originating endpoint, thereby cutting off media communication from the originating endpoint and the SBC. In some flow-through systems, the communications between the endpoints is encrypted using, e.g., Secured Real-time Transfer Protocol (SRTP). Thus, even if the media flows through the SBC, the SBC is unable to monitor the communications from the originating endpoint. This restraint on the endpoint's ability to communicate with the SBC can limit the types of services provided by the SBC after the original connection to the terminating endpoint is established.

Accordingly, it would be desirable to provide systems and methods for voice communication that enable the voice communications systems to more effectively communicate with the call endpoints.

DESCRIPTION OF THE DRAWINGS

FIGS. 3A-3B illustrate example SIP messages between an IVR system and an originating gateway for negotiating the opening of the first and second media paths in accordance with particular embodiments.

FIGS. 5A-5B illustrate example SIP messages between an IVR system and a originating gateway for negotiating the opening of the first and second media paths in accordance with particular embodiments.

FIGS. 8A-8B illustrate example SIP messages between an IVR system and an originating endpoint for negotiating the opening of the first and second media paths in a flow-through system.

DETAILED DESCRIPTION

Figure 1:
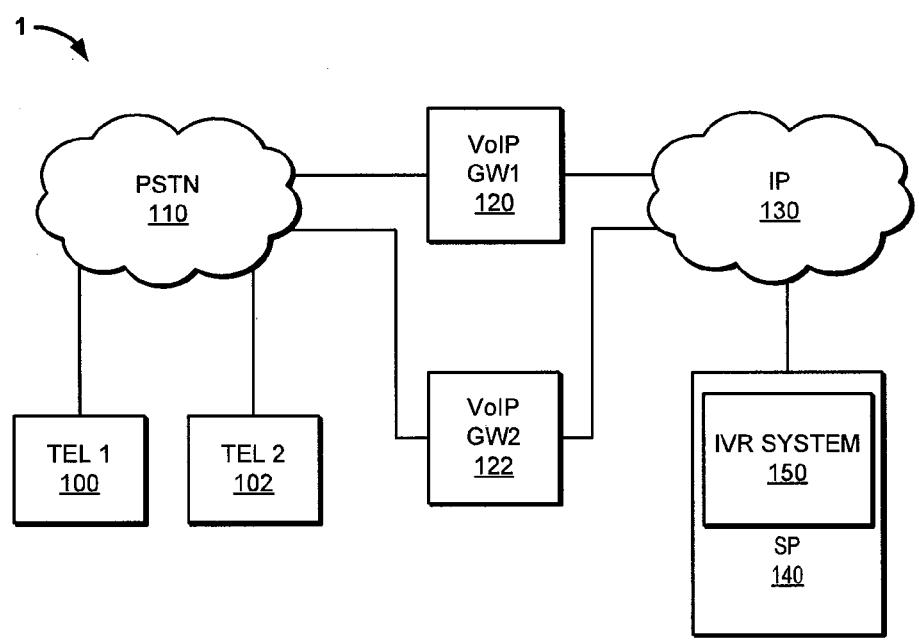
FIG. 1 is a simplified block diagram of an example VoIP environment, in accordance with particular embodiments.

In the following description, reference is made to the accompanying drawings which illustrate several embodiments of the present invention. It is understood that other embodiments may be utilized and mechanical, compositional, structural, electrical, and operational changes may be made without departing from the spirit and scope of the present disclosure. The following detailed description is not to be taken in a limiting sense, and the scope of the embodiments of the present invention is defined only by the claims of the issued patent.

Some portions of the detailed description which follows are presented in terms of procedures, steps, logic blocks, processing, and other symbolic representations of operations on data bits that can be performed on computer memory. Each step may be performed by hardware, software, firmware, or combinations thereof.

Systems and methods are provided for supporting communications between endpoints and IVR systems. In some embodiments, the IVR system establishes a flow-around media path between the originating gateway (OGW) and the terminating gateway (TGW), but maintains a media path between the IVR system and the OGW, which the IVR system can use to provide audio prompts to the OGW. These audio prompts may be initiated by the IVR system or may be in response to telephony events (e.g., keypad inputs) from the OGW. These inputs may be communicated to the IVR system out-of-band or may be communicated in-band via a bidirectional media path between the OGW and the IVR system.

In accordance with other embodiments, an IVR system may be configured to establish a secure media path between the OGW and the TGW, while maintaining the ability to receive telephony event notifications. These telephony event notifications may be transmitted to the IVR system in a variety of ways. In some cases, the telephony event notifications may be communicated to the IVR system via an unsecured media path between the OGW and the IVR system. In other cases, the telephony event notifications may be communicated in an unsecured portion of a packet transmitted from the OGW to the TGW via the secure media path. For example, when the OGW and the TGW communicate via an SRTP media path, the telephony event notification may be contained in the unsecured header of the SRTP packet. The IVR system may then be able to detect the telephony event notification, even though the payload portion of the packet is encrypted.

The telephony events communicated to the IVR system may correspond to DTMF digits entered by the user by pressing keys on the telephone keypad. Alternatively, the telephony events may correspond to fax-related tones, standard subscriber line tones, country-specific subscriber line tones, or trunk events.

An endpoint is an entity from which media originates or terminates. This endpoint can be, e.g., an H.323 terminal or a SIP user agent. Each VoIP session between endpoints will include three sets of communication flows: signaling, media streams, and media control messages. In the signaling stage, the two endpoints use a signaling protocol to establish the connection between the endpoints by negotiating the codec and IP addresses and/or ports that will be used for the session's media streams and media control messages. Different codecs are used for different types of sessions, such as G.711 for "toll quality" voice communication, G.729 for lower quality voice communication, and T.38 for transmitting fax data over IP.

FIG. 1 is a simplified block diagram of an example VoIP environment 1, in accordance with embodiments of the present invention. This environment 1 includes a first telephone 100 connected to the Public Switched Telephone Network (PSTN) 110, and a first VoIP gateway (VoIP GW) 120 coupled to a service provider (SP) 140 via an IP network 130, such as, e.g., the Internet. The SP 140 includes an IVR system 150 that allows a person using telephone 100 to interface with a computer system and select one or more options from a voice menu provided by the IVR application 150, as will be described in greater detail below. The IVR system 150 may be implemented an application running on a Session Border Controller (SBC) system or other server.

Figure 2:
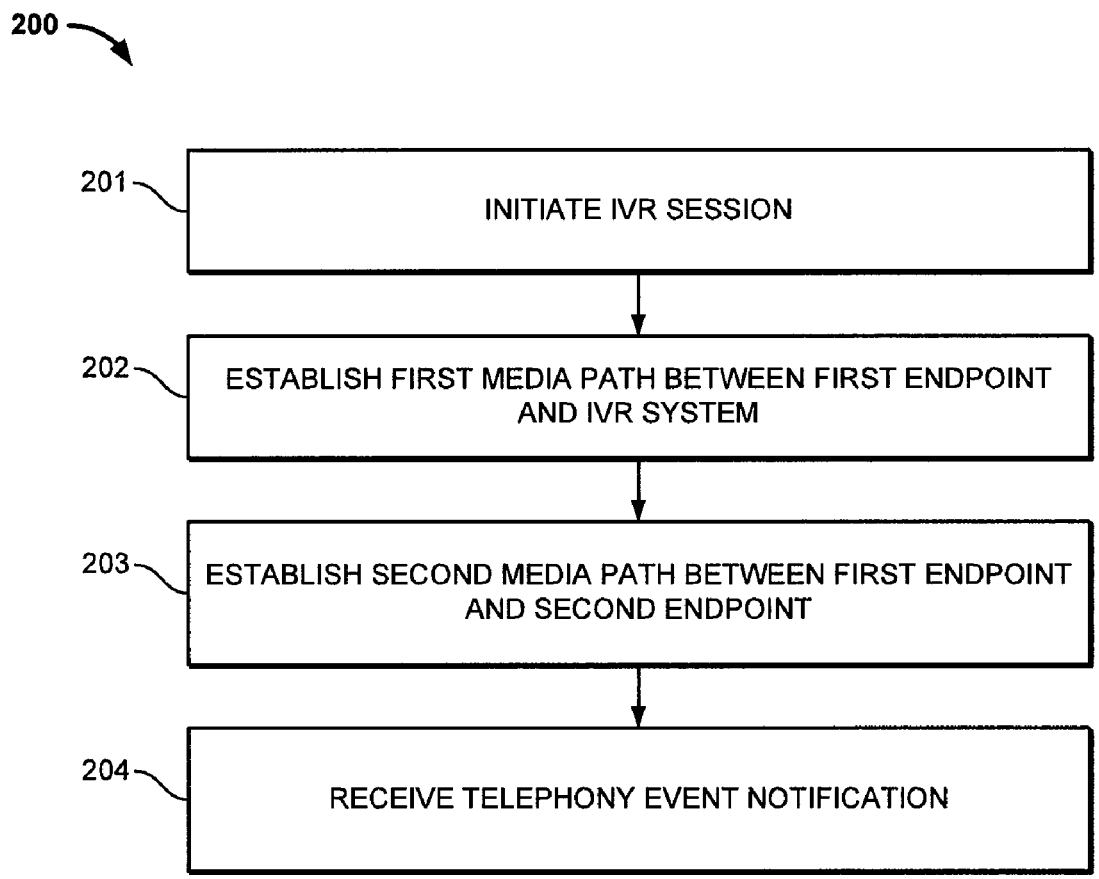
FIG. 2 is a flowchart of a method of managing a VoIP session in accordance with particular embodiments.

FIG. 2 is a flowchart of a method of managing a VoIP session in accordance with certain embodiments. In step 201, an IVR session is initiated. This session could be initiated, e.g., by a subscriber using the telephone 100 on the PSTN 110 to call the service provider 140. The subscriber's call over the PSTN 110 is terminated by the first VoIP GW 120, which establishes a connection with the IVR system 150 of the service provider 140. After the call with the IVR system 150 is connected, the IVR system 150 may provide voice prompts requesting that the subscriber enter identifying information, such as a calling card number of other identification number, using the keypad on the telephone 100.

After the subscriber is authenticated, the IVR system 150 may provide voice prompts requesting that the subscriber enter the destination telephone number using the telephone keypad. After the subscriber enters the destination telephone number, the IVR system 150 will initiate a connection with the destination telephone number. If the destination is a telephone 102 on the PSTN 110, the IVR system 150 will establish a connection with the VoIP GW 122, which corresponds to that destination telephone number. The VoIP GW 122 then serves as the TGW for the call.

In step 202, a first media path is established between the first endpoint (e.g., VoIP GW 120) and the IVR system 150. In step 203, a second media path is established between the first endpoint and the second endpoint (e.g., VoIP GW 122). This first media path is used to transmit audio prompts from the IVR system 150 to the first endpoint. These audio prompts can be used for a variety of purposes. For example, the audio prompt may be used to warn the subscriber that the number of minutes remaining on the calling card has reached a low level.

In step 204, the IVR system 150 receives a telephony event notification from the first endpoint. If the first media path is bidirectional and an in-band signaling protocol is used, the IVR system 150 can receive this telephony event notification via the first media path. If the first media path is one-way from the IVR system 150 to the first endpoint, then the telephony event notification may be transmitted out-of-band to the IVR system 150.

As described above, the telephony events communicated to the IVR system may correspond to DTMF digits entered by the user by pressing one or more keys on the telephone keypad. In one common application, the subscriber may press the # key on the keypad to access the IVR voice menu. For example, this input from the subscriber may terminate the call and return the subscriber to the original voice menu, or may place the call on hold while the subscriber accesses a menu to obtain some service, such as to initiate a conference call. After the IVR system receives the notification of the telephony event (e.g., the # key), the IVR system will respond with audio prompts via the first media path.

The subscriber's telephone keypad inputs can be communicated to the IVR system in a variety of ways. A conventional telephone 100 will transmit DTMF tones over the PSTN 110 to the VoIP GW 120. The GW 120, in turn, can transmit those tones in a variety of ways, either in-band together with the voice stream or out-of-band. For example, the DTMF tone may be compressed with the voice stream, transported to the receiving party in-band, and then decompressed. Alternatively, the VoIP gateway 120 may utilize a DTMF relay method to separate DTMF digits from the voice stream and send those digits through a signaling channel rather than through the RTP media channel. In yet other embodiments, Named Telephony Events (NTEs) may be used to relay the DTMF tones in-band, as described in RFC 2833, "RTP Payload for DTMF Digits, Telephony Tones and Telephony Signals," developed by the Internet Engineering Task Force (IETF) Audio/Video Transport (AVT) working group, the contents of which are incorporated by reference herein in its entirety. RFC 2833 defines formats of NTE RTP packets used to transport DTMF digits, hookflash, and other telephony events between two endpoints.

The VoIP GW 120 and the IVR system 150 may communicate using any of a variety of VoIP protocols, such as, e.g., SIP or H.323, and the various media paths may be established in accordance with the protocol used.

FIGS. 3A-3B illustrate example SIP messages between the IVR system 150 and the VoIP GW 120 for negotiating the opening of the first and second media paths. FIG. 3A is a SIP INVITE request message 300 from the IVR system 150 to the VoIP GW 120. The first portion of the message 300 is a SIP header 301. The header 301 is followed by a first media description portion 302, which invites the VoIP GW 120 to establish a one-way media path (e.g., an RTP "sendonly" path) from the IVR system 150 (e.g., 2.2.2.2) and the OGW (e.g., VoIP GW 120). This media path is used to allow the IVR system 150 to provide voice prompts to the subscriber. Because the media path is a "sendonly" path, it only allows the IVR system 150 to transmit media to the OGW, but does not allow the IVR system 150 to receive media. Therefore, in this embodiment, any telephony events would be transmitted out-of-band in a separate signaling path established between the OGW and the IVR system 150.

The first media description portion 302 is followed by a second media description portion 303, which invites the VoIP GW 120 to establish a bidirectional media path between the OGW (e.g., VoIP GW 120) to the TGW (e.g., VoIP GW 122). This flow-around media path is used for the voice communications between the caller and the callee.

FIG. 3B is a SIP 200 OK response message 310 from the VoIP GW 120 to the IVR system 150. The first portion of the message 310 is a SIP header 311. The header 311 is followed by a first media description portion 312, which accepts and confirms the one-way media path from the IVR system 150 (e.g., 2.2.2.2) to the OGW (e.g., VoIP GW 120). The second media description portion 313 accepts and confirms the bi-directional media path between the OGW and the TGW.

Figure 4:
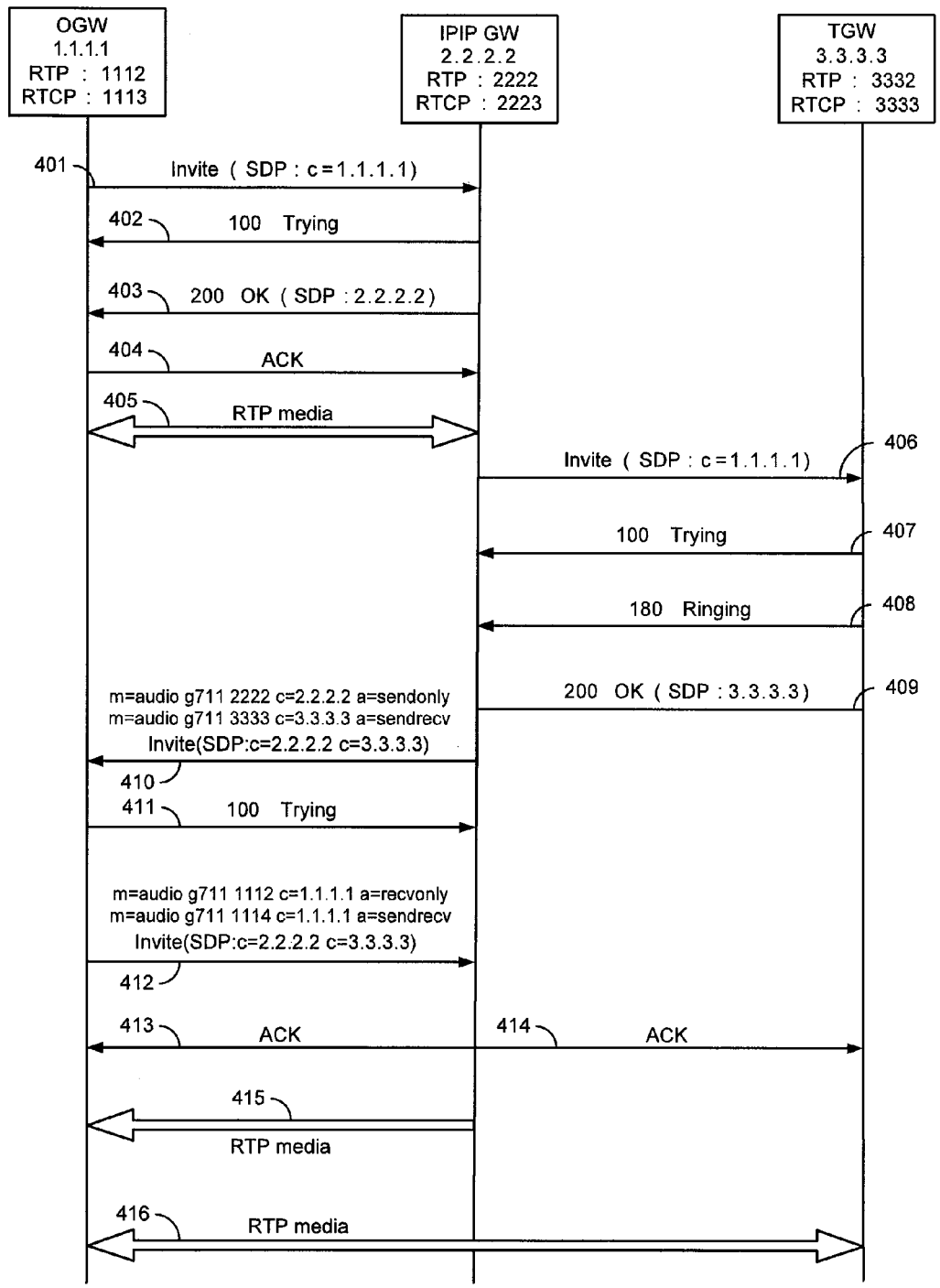
FIG. 4 is an example call flow in which a one-way media path is established from an IVR system and the originating gateway, in addition to two way media between originating and terminating endpoints.

FIG. 4 is an example call flow in which a one-way media path is established from the IVR system 150 and the OGW (e.g. VoIP GW 120 located at 1.1.1.1). In this embodiment, SIP is used as the signaling protocol. In other embodiments, other protocols, such as H.323, may be used. In step 401, a SIP INVITE message is transmitted from the OGW to the IVR system 150 (e.g., an IP-IP Gateway located at 2.2.2.2) to establish the initial call from the subscriber to the IVR application. In step 405, a bi-directional RTP media path is established. This media path enables the caller to transmit audio and DTMF digits in-band to the IVR system 150, and allows the IVR system 150 to transmit audio prompts back to the caller.

After the caller is authenticated and identifies the target telephone number, the IVR system 150 will transmit a SIP INVITE message to the TGW (e.g., VoIP GW 122 located at 3.3.3.3) in step 406. After the connection with the TGW is established in steps 407-409, a SIP INVITE (e.g., SIP INVITE message 300 in FIG. 3A) is transmitted from the IVR system 150 to the OGW. In step 412, a 200 OK message (e.g., response message 310 in FIG. 3B) is transmitted to the IVR system 150 from the OGW. In step 415, the one-way RTP media path is established from the IVR system 150 to the OGW, and in step 416, the bi-directional media path is established from the OGW to the TGW.

FIGS. 5A-5B illustrate example SIP messages between the IVR system 150 and the VoIP GW 120 for negotiating the opening of the first and second media paths in accordance with other embodiments. In some embodiments, telephony events such as DTMF digits may be transmitted using an in-band mechanism, such as, e.g., NTE. In this case, the media path between the OGW and the IVR system 150 is bidirectional, thereby allowing the IVR system 150 to receive the DTMF digits contained in the media packets.

FIG. 5A is a SIP INVITE request message 500 from the IVR system 150 to the VoIP GW 120. The first portion of the message 500 is a SIP header 501. The header 501 is followed by a first media description portion 502, which invites the VoIP GW 120 to establish a bidirectional media path (e.g., an RTP "sendrecv" path) between the IVR system 150 and the OGW (e.g., VoIP GW 120). This bidirectional media path is used to allow the IVR system 150 to provide voice prompts to the subscriber and receive NTE digits from the OGW. Therefore, in this embodiment, any telephony events could be transmitted in-band on the RTP path or out-of-band on a separate signaling path between the OGW and the IVR system 150.

The first media description portion 502 is followed by a second media description portion 503, which invites the VoIP GW 120 to establish a bidirectional media path between the OGW (e.g., VoIP GW 120) to the TGW (e.g., VoIP GW 122). As with FIGS. 3A-3B, this flow-around media path is used for the voice communications between the caller and the callee.

FIG. 5B is a SIP 200 OK response message 510 from the VoIP GW 120 to the IVR system 150. The first portion of the message 510 is a SIP header 511. The header 511 is followed by a first media description portion 512, which confirms the bi-directional media path from the IVR system 150 to the OGW. The second media description portion 513 confirms the bi-directional media path between the OGW and the TGW.

Figure 6:
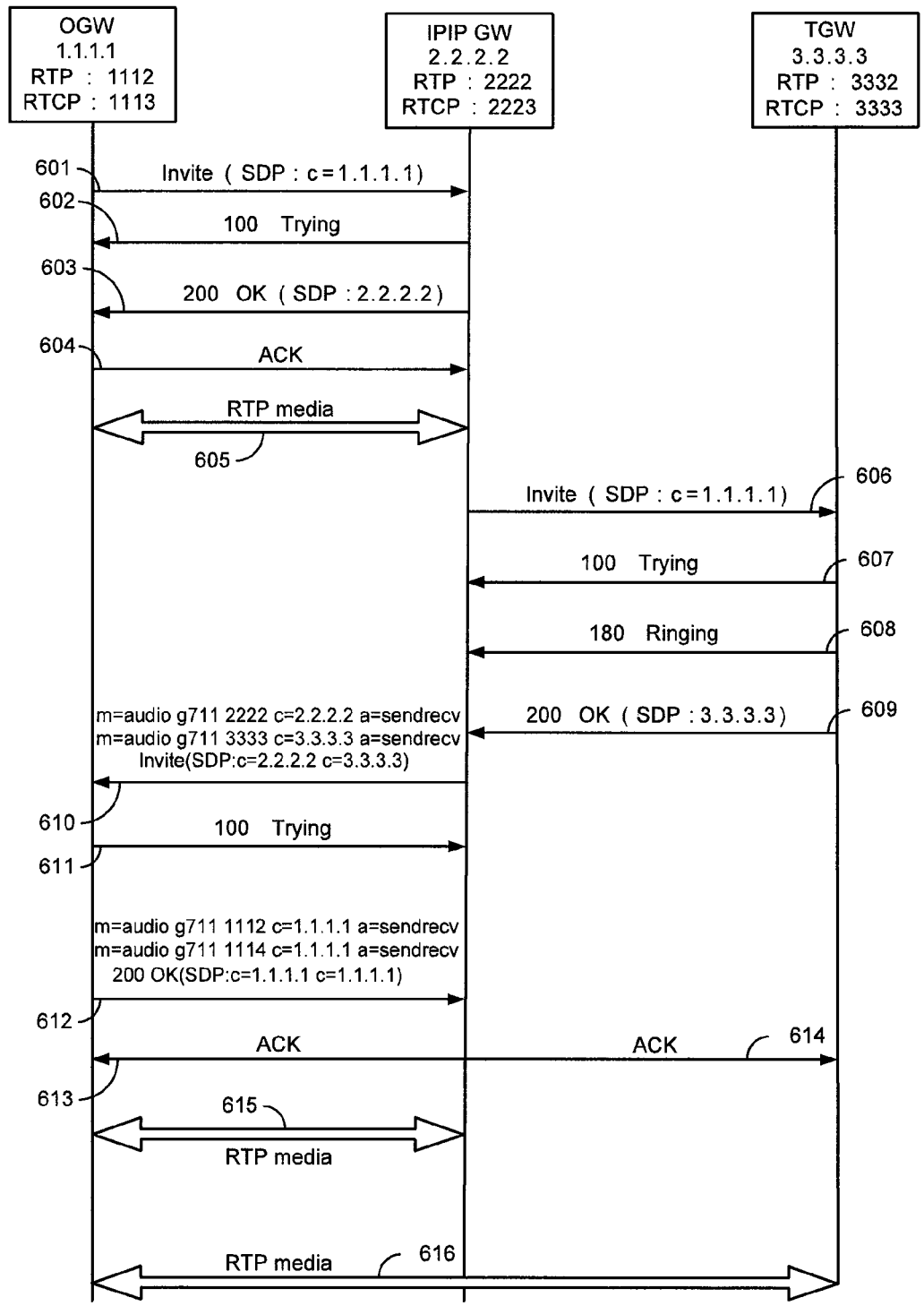
FIG. 6 is an example call flow in which a bi-directional media path is established between an IVR system and the originating gateway.

FIG. 6 is an example call flow in which a bi-directional media path is established between the IVR system 150 and the OGW. In steps 601-609, the SIP sessions are established, similar to steps 401-409 in FIG. 4. In step 610, a SIP INVITE (e.g., SIP INVITE message 500 in FIG. 5A) is transmitted from the IVR system 150 to the OGW, and in step 612, a 200 OK message (e.g., response message 510 in FIG. 5B) is transmitted to the IVR system 150 from the OGW. In step 615, the bi-directional RTP media path is established from the IVR system 150 to the OGW, and in step 616, the bi-directional media path is established from the OGW to the TGW.

The OGW may include media switch logic to select the media to be presented to the calling party. This media switch logic may be used to switch between the first media path with the VoIP GW 122 and the second media path with the IVR system 150. Therefore, at any point in time, the media to the calling party would be either from the called party (TGW) or the prompts from the IVR system 150.

The switching may be triggered by a variety of mechanisms. For example, the media switch logic may be configured to switch to the second media path with the IVR system 150 upon detection of a predetermined telephony event. Alternatively, the media switch logic may be configured to switch to the second media path upon receipt of a predetermined message from the IVR system 150. In yet other embodiments, the first and second media paths may be combined as a conference call, rather than switching between the paths.

In some embodiments, the media path between the OGW and the TGW may be secure, using, e.g., SRTP. In this case, the telephony events (e.g., DTMF digits) can be communicated to the IVR system 150 using out-of-band signaling or in-band via clear RTP over the second media path with the IVR system 150.

Certain embodiments may provide various advantages not provided by prior art systems. For example, an SBC may be capable of handling IVR calls with media flow-around between gateways or endpoints, while still maintaining the ability to provide voice prompts and messages to the calling party. With these embodiments, there is no need to close and re-establish media paths, which can involve several signaling message exchanges, thereby eliminating additional overhead and avoiding delays in the voice streams. Instead, the communication may utilize a single additional one way RTP (if out-of-band digits are used) or bi-directional RTP (if NTE digits are used). By optimizing the use of network resources, the maximum number of simultaneously supported calls may be increased.

In addition, the embodiments described above do not utilize any additional messages between the IVR system 150 and the OGW, as compared with conventional call flows. This is accomplished by adding the request for the additional media path to the INVITE and 200 OK messages that would normally be utilized in conventional call flows. Moreover, the existing Session Description Protocol (SDP) infrastructure can be used with the same methods of parsing and building media information. For example, the existing SDP offer/answer model may be used for representing additional one way media or bidirectional media.

Secure Media Paths

In accordance with certain embodiments, the media path between the OGW and the TGW is a secure connection, such as an SRTP connection. In this case, the IVR system 150 is unable to monitor the communications between the OGW and the TGW. Even if the OGW and TGW are communicating using a flow-through method, the IVR system 150 is unable to access the payload portion of the packets which flow through the IVR system 150. It may be possible for the IVR system 150 to authenticate, encode, and decode each of the SRTP packets passing through the IVR system 150 to the TGW. However, this is very processor-intensive, thereby consuming an excessive amount of resources, adding delay to the communications, and limiting the number of simultaneous calls that can be supported by the IVR system 150. As described above, it may be desirable for the IVR system 150 to be able to monitor the media path so as to detect any telephony events that occur after the call to the TGW is connected, such as when the subscriber presses the # key to return to the calling card menu.

Figure 7:
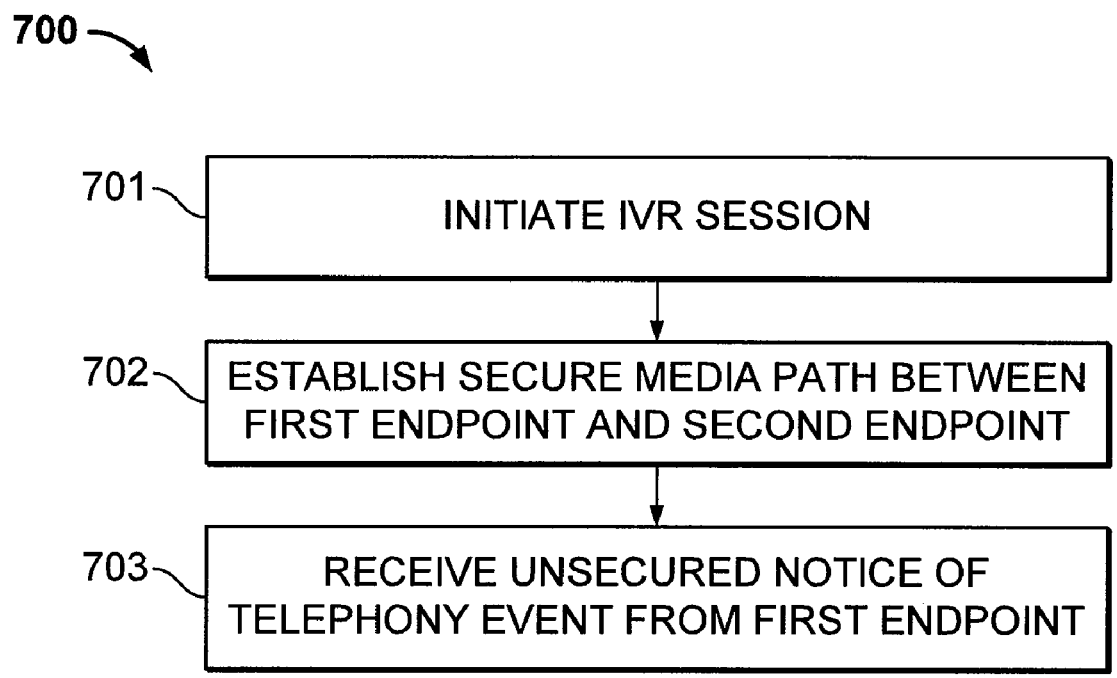
FIG. 7 is a flowchart of a method of managing a VoIP session in accordance with particular embodiments.

FIG. 7 is a flowchart 700 of a method of managing a VoIP session in accordance with particular embodiments. In step 701, an IVR session is initiated. Similar to the method described above with respect to FIG. 2, this session could be initiated by a subscriber using the telephone 100 on the PSTN 110 to call the service provider 140 to access the IVR system 150. After the subscriber is authenticated and the subscriber enters the destination telephone number using the telephone keypad, the IVR system 150 will initiate a connection with the destination telephone number.

In step 702, a first secure media path is established between the first endpoint (e.g., VoIP GW 120) and the second endpoint (e.g., VoIP GW 122) corresponding to the destination telephone number. This media path may be secured, e.g., using SRTP or other encryption protocol supported by the endpoints.

In step 703, the IVR system 150 receives an unsecured notice of a telephony event from the first endpoint. This unsecured notice may be provided in a variety of ways. For example, if the telephony event notifications are DTMF digits contained in NTE packets as part of the SRTP stream, then it may be desirable to negotiate and pass telephony event notifications in a second unsecured media path using plain RTP, separate from the SRTP stream which contains the voice packets. This enables the IVR system 150 to continue receiving notifications of telephony events, while continuing to secure the end-to-end user conversation using SRTP. Alternatively, it may be desirable to utilize only a single media path and to embed the telephony events in the unsecured header portion of the SRTP packets. Thus, the IVR system 150 will be able to receive notifications of the telephony events from a secure media path even though the IVR system 150 cannot access the payload portion of the SRTP packets.

FIGS. 8A-8B illustrate example SIP messages between the IVR system 150 and the VoIP GW 120 for negotiating the opening of the first and second media paths in a flow-through system. FIG. 8A is a SIP INVITE request message 800 from the IVR system 150 to the VoIP GW 120. The first portion of the message 800 is a SIP header 801. The header 801 is followed by a first media description portion 802, which invites the VoIP GW 120 to establish a secure media path (e.g., an SRTP path) to 3.3.3.3 on User Datagram Protocol (UDP) port 17012. The first media description portion 802 also includes additional description regarding the specified media. This secure media path is used to allow the OGW to transmit voice packets to the TGW via the IVR system 150. Because the media path is secure, the IVR system 150 will not be able to monitor these packets. Therefore, a second media description portion 803 is provided, which invites the VoIP GW 120 to establish an unsecured media path (e.g., an RTP path) with the IVR system 150.

FIG. 8B is a SIP 200 OK response message 810 from the VoIP GW 120 to the IVR system 150. The first portion of the message 810 is a SIP header 811. The header 811 is followed by a first media description portion 812, which confirms the secure media path, and a second media description portion 813, which confirms the unsecured media path.

The unsecured RTP media path is used to transmit media from the OGW to the IVR system 150, thereby enabling the IVR system 150 to detect DTMF digits and other telephony events send in-band from the OGW. In the first media description portion 812, the media line (m=audio 18200 RTP/SAVP 0 101) indicates that RTP/SAVP to represent SRTP media, and in the second media description portion 813, the media line (m=audio 17012 RTP/AVP 0 101) indicates that RTP/AVP will be used to represent SRTP media.

Figure 9:
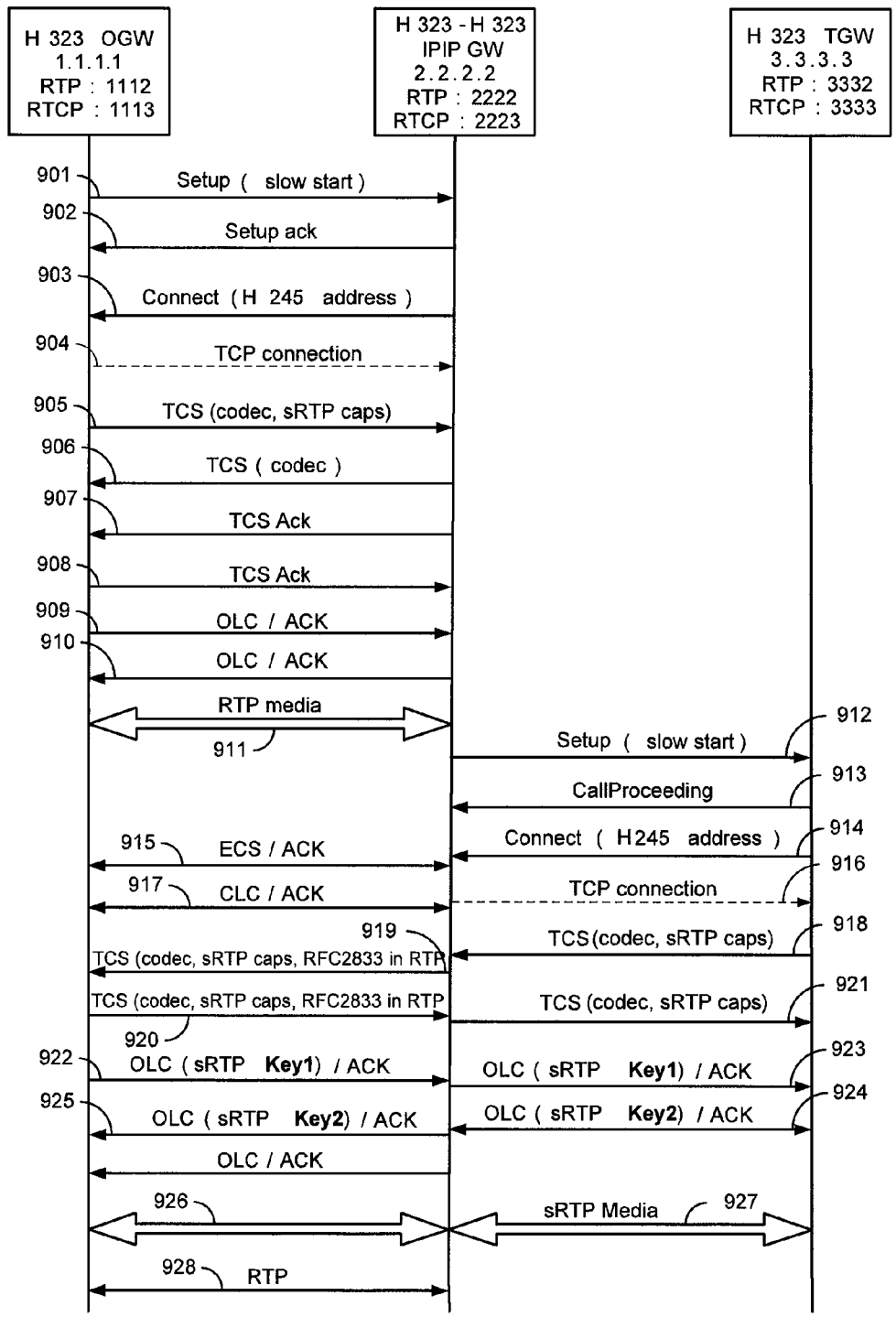
FIG. 9 is an example call flow in which a secure media path and an unsecured media path are established with the originating gateway in a flow-through system.

FIG. 9 is an example call flow in which a secure media path and an unsecured media path are established with the OGW in a flow-through system. In this embodiment, H.323 is used as the signaling protocol. In other embodiments, other protocols, such as SIP, may be used. In step 901, a Setup message is transmitted from the OGW to the IVR system 150 (e.g., an IP-IP Gateway located at 2.2.2.2) to establish the initial call from the subscriber to the IVR application. In step 905, the OGW transmits a TCS message to the IVR system 150 identifying the codec to be used and providing a first encryption key, key1. In step 906, the IVR system 150 responds back confirming the codec, but not including any corresponding key. At this point, since the remote endpoint does not support SRTP, the OGW is configured to default to plain RTP. In step 911, a bi-directional RTP media path is established. This media path enables the caller to transmit audio and DTMF digits in-band to the IVR system 150, and allows the IVR system 150 to transmit audio prompts back to the caller.

After the caller is authenticated and identifies the target telephone number, the IVR system 150 will transmit a Setup message to the TGW (e.g., VoIP GW 122 located at 3.3.3.3) in step 912. After the connection with the TGW is established in steps 913-917, the TGW in step 918 transmits a TCS message identifying a codec and providing a second encryption key, key2. In step 919, this is forwarded by the IVR system 150 along with an instruction to transmit NTE messages in RTP, in accordance with RFC 2833. In step 920, the OGW responds with a TCS message identifying a codec, providing a third encryption key, key3, and confirming the transmission of NTE messages in RTP. In step 921, the IVR system 150 forwards a TCS message including the codec and encryption key3. The OLC is acknowledged in steps 922-925.

Finally, in step 926, an SRTP media path is established between the OGW and the IVR system 150, and in step 927, the SRTP media path established between the OGW and the TGW to forward the packets received on the SRTP media path between the OGW and the IVR system 150. In step 928, an unsecured RTP media path is established between the OGW and the IVR system 150. These packets do not need to be forwarded to the TGW and can be dropped by the IVR system 150 after inspection.

Because this is a flow-through system, the OGW and TGW will exchange address and port information with the IVR system 150. The OGW will transmit RFC 2833 digits as part of the RTP media path with the IVR system 150. In addition, the same RFC 2833 packet plus other voice SRTP packets are forwarded through the IVR system 150 to the TGW. As these packets are received by the IVR system 150, the header portion identifying the OGW as the packet originator is overwritten with a new header identifying the IVR system 150 as the packet originator. The IVR system 150 is capable of distinguishing between the RTP packets (whose payloads should be inspected for relevant telephony events) and SRTP packets (whose payloads should not be inspected) based on the payload identification number contained in the header of the packets from the OGW. The payload numbers to be used by the OGW may be negotiated as part of the initial signaling process.

Accordingly, the IVR system 150 will have access to the telephony events via the RTP media path, but not to the secure voice packets contained in the flow-through SRTP media path.

Figure 10:
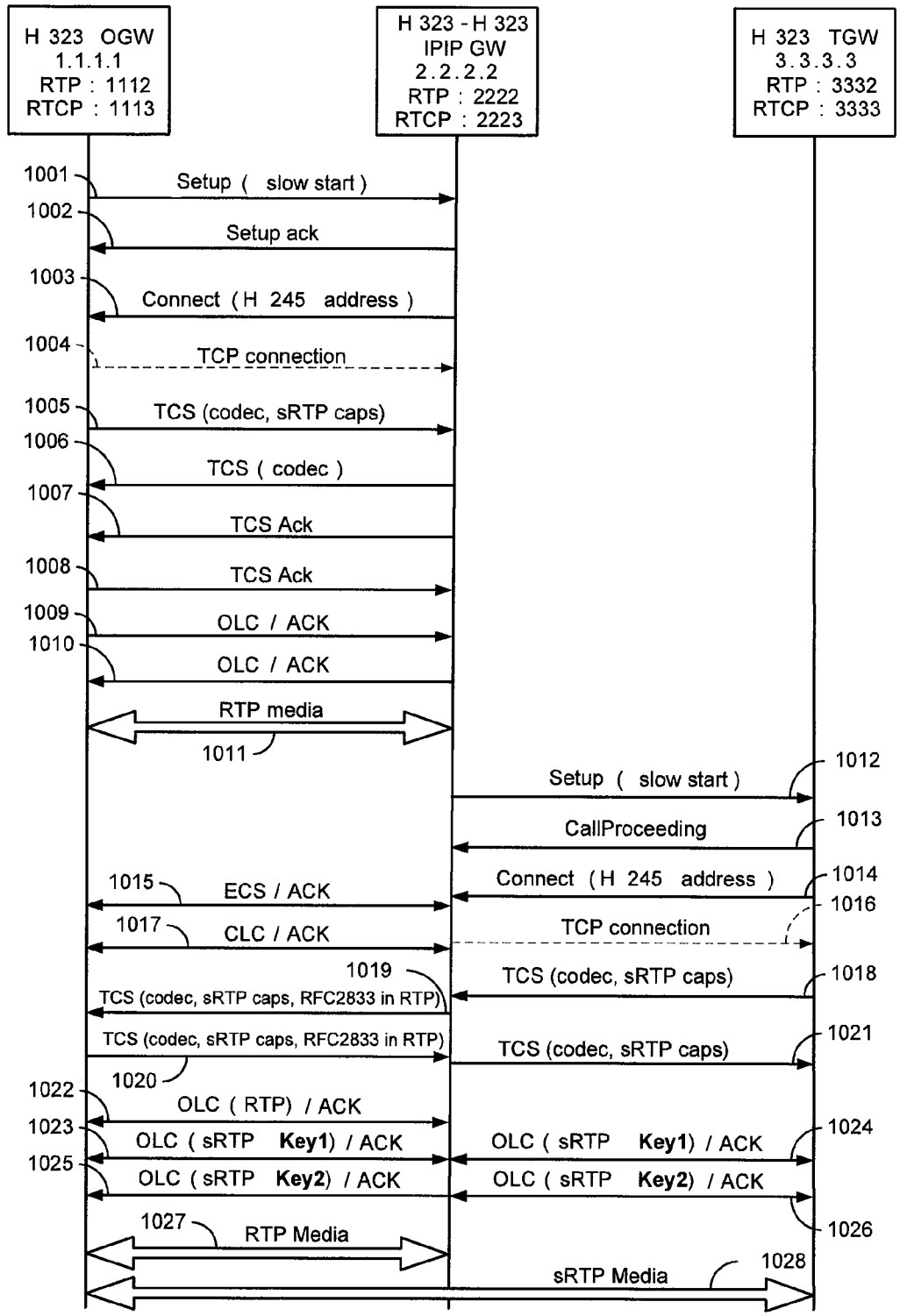
FIG. 10 is an example call flow in which a secure media path and an unsecured media path are established with the originating gateway in a flow-around system.

FIG. 10 is an example call flow in which a secure media path and an unsecured media path are established with the OGW in a flow-around system. This call flow is similar to the call flow described above with respect to FIG. 9, except that the secure SRTP media path is established directly between the OGW and the TGW without flowing through the IVR system 150. Therefore, in step 1019, the IVR system 150 negotiates with the OGW to transmit RFC 2833 digits to a first address corresponding to the IVR system 150 in an unsecured RTP path, and to transmit RFC 2833 digits as well as voice packets to a second address corresponding to the TGW (e.g., 2.2.2.2). Therefore, in step 1027, a first unsecured media path with the IVR system 150 is established, and in step 1028, a second secured media path with the TGW is established.

Figure 11:
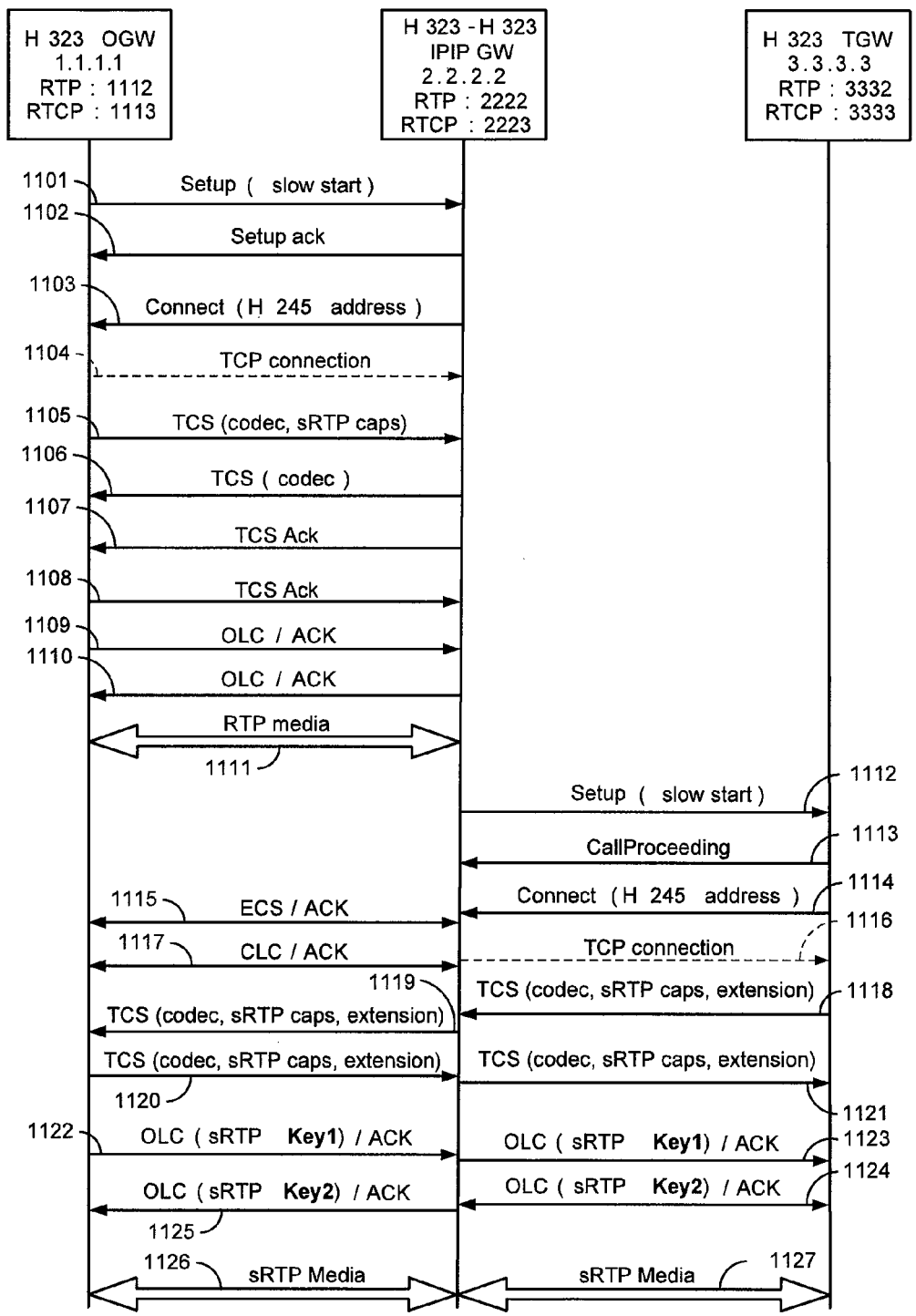
FIG. 11 is an example call flow of a process of communicating telephony event notifications in the unsecured header portion of packets transmitted on a secure media path.

In accordance with other embodiments, the telephony event notifications are not communicated to the IVR system 150 in a separate unsecured media path. Instead, the notifications are provided in the unsecured header portion of packets transmitted on a secure media path. FIG. 11 is an example call flow of such a process. This call flow is similar to the call flow described above with respect to FIG. 9. However, the unsecured RTP media path is not established. Instead, in step 1119, the IVR system 150 instructs the OGW to include an extension to its SRTP packets. This extension includes a description of the telephony event notification.

Embodiments of the present invention may provide various advantages not provided by prior art systems. For example, because the telephony event notifications are provided separate from the encrypted data, network resources, such as utilization of the DSP for the IVR system, need not be consumed for inspecting each SRTP packet being transmitted from the OGW to the TGW. Therefore, the IVR system would be able to support a greater number of simultaneous calls than it otherwise would be able to because all of the calls would not be encrypted for the duration of the call.

While the invention has been described in terms of particular embodiments and illustrative figures, those of ordinary skill in the art will recognize that the invention is not limited to the embodiments or figures described. For example, in many of the embodiments described above, the user of the telephone 100 places the call to the IVR system 150. In other embodiments, the IVR system 150 may initiate the call to the user.

The program logic described indicates certain events occurring in a certain order. Those of ordinary skill in the art will recognize that the ordering of certain programming steps or program flow may be modified without affecting the overall operation performed by the preferred embodiment logic, and such modifications are in accordance with the various embodiments of the invention. Additionally, certain of the steps may be performed concurrently in a parallel process when possible, as well as performed sequentially as described above.

Therefore, it should be understood that the invention can be practiced with modification and alteration within the spirit and scope of the appended claims. The description is not intended to be exhaustive or to limit the invention to the precise form disclosed. It should be understood that the invention can be practiced with modification and alteration and that the invention be limited only by the claims and the equivalents thereof.

What is claimed is:

1. A method, comprising:
   initiating an interactive voice response (IVR) session between a first endpoint and an IVR system over an IP network, wherein said initiating comprises issuing a first signaling protocol invite message from the first endpoint to the IVR system and establishing an initial media path between the first endpoint and the IVR system;
   issuing a second signaling protocol invite message from the IVR system to a second endpoint to establish a connection between the IVR system and the second endpoint;
   establishing a first media path between the first endpoint and the second endpoint;
   establishing a second media path between the first endpoint and the IVR system; and
   receiving at the IVR system a notice of a telephony event from the first endpoint,
   wherein said establishing the first media path and the second media path comprises issuing a third signaling protocol invite message from the IVR system to the first endpoint for the first endpoint to establish the first media path which is bidirectional between the first endpoint and the second endpoint and for the first endpoint to establish the second media path between the first endpoint and the IVR system.

2. The method of claim 1, wherein:
   the notice of the telephony event corresponds to a dual-tone multi-frequency (DTMF) signal.

3. The method of claim 1, wherein:
   in response to said receiving the notice of the telephony event, transmitting an audio message from the IVR system to the first endpoint via the second media path.

4. The method of claim 1, wherein:
   said establishing the second media path comprises establishing a one-way media path from the IVR system to the first endpoint; and
   said receiving the notice of the telephony event comprises receiving an out-of-band notice of the telephony event via a signaling path between the first endpoint and the IVR system.

5. The method of claim 1, wherein:
   said establishing the second media path comprises establishing a bi-directional media path between the IVR system and the first endpoint; and
   said receiving the notice of the telephony event comprises receiving an in-band notice of the telephony event via the second media path between the first endpoint and the IVR system.

6. The method of claim 1, wherein:
   the first media path comprises a first Real-time Transfer Protocol (RTP) session; and
   the second media path comprises a second RTP session.

7. The method of claim 1, wherein:
   the first media path comprises a first Secure Real-time Transfer Protocol (SRTP) session.

8. A method, comprising:
   initiating an interactive voice response (IVR) session between a first endpoint and an IVR system over an IP network, wherein said initiating comprises issuing a first signaling protocol invite message from the first endpoint to the IVR system and establishing an initial media path between the first endpoint and the IVR system;

issuing a second signaling protocol invite message from the IVR system to a second endpoint to establish a connection between the IVR system and the second endpoint;

establishing a secure media path between the first endpoint and the second endpoint via the IVR system;

establishing an unsecured media path between the first endpoint and the IVR system; and receiving an unsecured notice of a telephony event from the first endpoint, wherein said establishing the secure media path and the unsecured media path comprises issuing a third signaling protocol invite message from the IVR system to the first endpoint for the first endpoint to establish the secure media path between the first endpoint and the second endpoint via the IVR system and including in the third signaling protocol invite message a request for the first endpoint to establish the unsecured media path between the first endpoint and the IVR system.

9. The method of claim 8, wherein:
the notice of the telephony event corresponds to a dual-tone multi-frequency (DTMF) signal.

10. The method of claim 8, wherein:
the unsecured notice of the telephony event is transmitted over the unsecured media path.

11. The method of claim 10, further comprising:
instructing the first endpoint to transmit audio via the secure media path and notices of telephony events via the unsecured media path.

12. The method of claim 10, further comprising:
forwarding the unsecured notice of the telephony event from the IVR system to the second endpoint.

13. The method of claim 10, further comprising:
transmitting the unsecured notice of the telephony event from the first endpoint to the IVR system via the unsecured media path and to the second endpoint via the secured media path.

14. The method of claim 8, wherein:
the unsecured notice of the telephony event is contained in a header of a packet transmitted over the secured media path.

15. The method of claim 14, wherein:
the secured media path comprises a Secured Real-time Transfer Protocol (SRTP) session; and
the unsecured media path comprises a Real-time Transfer Protocol (RTP) session.

16. The method of claim 8, wherein:
the secured media path comprises a Secured Real-time Transfer Protocol (SRTP) session.

17. A voice communications system, comprising:
a control system having a non-transitory machine-readable medium comprising a plurality of machine-readable instructions which when executed by one or more processors of a server are adapted to cause the server to perform a method comprising:

initiating an interactive voice response (IVR) session between a first endpoint and an IVR system over an IP network, wherein said initiating comprises issuing a first signaling protocol invite message from the first endpoint to the IVR system and establishing an initial media path between the first endpoint and the IVR system;

issuing a second signaling protocol invite message from the IVR system to a second endpoint to establish a connection between the IVR system and the second endpoint;

establishing a first media path between the first endpoint and the second endpoint;

establishing a second media path between the first endpoint and the IVR system; and receiving at the IVR system a notice of a telephony event from the first endpoint, wherein said establishing the first media path and the second media path comprises issuing a third signaling protocol invite message from the IVR system to the first endpoint for the first endpoint to establish the first media path which is bidirectional between the first endpoint and the second endpoint and for the first endpoint to establish the second media path between the first endpoint and the IVR system.

* * * * *